US008784025B2

(12) United States Patent
Becherer et al.

(10) Patent No.: US 8,784,025 B2
(45) Date of Patent: Jul. 22, 2014

(54) MOUNTING DEVICE FOR FASTENING A MODULE ONTO A COMPONENT, IN PARTICULAR AN OUTSIDE HOUSING OF ANOTHER MODULE

(75) Inventors: Frank Becherer, Neuried-Ichenheim (DE); Winfried Rauer, Fischbach (DE)

(73) Assignee: Vega Grieshaber KG, Wolfach (DE)

( * ) Notice: Subject to any disclaimer, the term of this patent is extended or adjusted under 35 U.S.C. 154(b) by 545 days.

(21) Appl. No.: 13/086,348

(22) Filed: Apr. 13, 2011

(65) Prior Publication Data

US 2012/0009041 A1     Jan. 12, 2012

(30) Foreign Application Priority Data

Jul. 9, 2010    (EP) .................................... 10007071

(51) Int. Cl.
     *F16B 39/00*         (2006.01)
(52) U.S. Cl.
     USPC .......................................... 411/107; 411/352
(58) Field of Classification Search
     USPC .................................. 411/107, 173, 347, 352
     IPC ..................................................... F16B 5/0208
     See application file for complete search history.

(56) References Cited

U.S. PATENT DOCUMENTS

| | | | | | |
|---|---|---|---|---|---|
| 3,465,803 | A | * | 9/1969 | Swanstrom et al. | 411/349 |
| 4,145,800 | A | * | 3/1979 | Scholz et al. | 29/402.15 |
| 5,462,395 | A | * | 10/1995 | Damm et al. | 411/107 |
| 6,074,146 | A | * | 6/2000 | Soemer | 411/353 |
| 6,379,076 | B1 | | 4/2002 | Reinhold et al. | |
| 6,468,011 | B2 | * | 10/2002 | Mayer | 411/353 |
| 6,644,903 | B1 | * | 11/2003 | Arand | 411/352 |
| 6,761,521 | B2 | * | 7/2004 | McCormack et al. | 411/353 |
| 7,808,791 | B2 | * | 10/2010 | Li et al. | 361/719 |
| 7,938,607 | B2 | * | 5/2011 | Wang | 411/107 |
| 2001/0024607 | A1 | * | 9/2001 | Frattarola | 411/107 |

(Continued)

FOREIGN PATENT DOCUMENTS

| | | |
|---|---|---|
| DE | 42 42 439 | 3/1994 |
| DE | 20 2004 004 893 | 9/2005 |

(Continued)

OTHER PUBLICATIONS

German Pat. Appln. No. 10007071.3 dated Dec. 23, 2010, International Search Report, 7 pages, English translation, 3 pages.

(Continued)

*Primary Examiner* — Gary Estremsky

(74) *Attorney, Agent, or Firm* — Andrew F. Young, Esq.; Lackenbach Siegel, LLP

(57) ABSTRACT

The invention relates to a mounting device for fastening a module onto a component, in particular an outside housing of another module. The device includes a fastening screw having a thread, a screw carrier to receive the screw shaft of the fastening screw, and a thread carrier which is connected to the component and has an inside thread corresponding to the thread of the fastening screw. A force-locking connection between the screw carrier and the thread carrier is established by means of the fastening screw in the fastening position, and the module is supported on a supporting element of the component in the fastening position. The screw shaft of the fastening screw has an additional shaft section which is connected to the front shaft section at the screw head end for receiving a spring element.

20 Claims, 2 Drawing Sheets

(56) References Cited

U.S. PATENT DOCUMENTS

| | | | |
|---|---|---|---|
| 2002/0172574 A1* | 11/2002 | McCormack et al. | 411/352 |
| 2003/0175091 A1* | 9/2003 | Aukzemas et al. | 411/107 |
| 2005/0163588 A1* | 7/2005 | Gass et al. | 411/107 |
| 2006/0047889 A1 | 3/2006 | Sasaki et al. | |
| 2008/0056844 A1 | 3/2008 | Aukzemas et al. | |
| 2008/0075403 A1 | 3/2008 | Holt et al. | |
| 2010/0165580 A1 | 7/2010 | Li et al. | |

FOREIGN PATENT DOCUMENTS

| | | |
|---|---|---|
| DE | 10 2006 020 630 | 11/2007 |
| DE | 10 2006 020630 | 11/2007 |
| DE | 10 2006 059 232 | 6/2008 |
| FR | 2 687 019 | 1/1992 |
| JP | H01156308 | 10/1989 |
| WO | WO 99/53206 | 10/1999 |
| WO | WO 02/48557 | 6/2002 |

OTHER PUBLICATIONS

German Patent Appln. No. 10 007 071.3, Office Action mailed Dec. 11, 2013, 4 pages—German; 1 pages—English.

* cited by examiner

MOUNTING DEVICE FOR FASTENING A MODULE ONTO A COMPONENT, IN PARTICULAR AN OUTSIDE HOUSING OF ANOTHER MODULE

CROSS REFERENCE TO RELATED APPLICATIONS

This application claims priority from European Patent Application Serial No. 10 007 071.3, filed Jul. 9, 2010, the entire contents of which is herein incorporated fully by reference.

FIGURE FOR PUBLICATION

FIG. 1

BACKGROUND OF THE INVENTION

1. Field of the Invention

The present invention relates to a mounting device for fastening a module onto a component. In particular, the present invention relates to a mounting device for fastening a module onto an outside housing of another component, as well as relating to a fastening screw for the mounting device.

2. Description of the Related Art

The related art involves electronic units, serving as modules, which can be mounted by means of fastening screws on a component, for example, on an outside housing of another module.

FIG. 3 illustrates such a situation according to which a module 1 as an electronic analyzer of a filling level meter is to be attached as an additional module by means of a screw connection to an outside housing 2 of the filling to level meter. For mounting, the module 1 is attached to a supporting element (not shown in FIG. 2) of the outside housing 2 before being fastened [onto the component] so that the module 1 is supported thereon.

According to FIG. 3, the outside housing 2 has a fastening dome 3 as a thread carrier with a blind thread 4 for receiving a thread arranged on a shaft 5 of a fastening screw 6. For this purpose the fastening screw 6 is guided through a through-opening 7 arranged on a screw carrier 8 and is screwed into the thread of the fastening dome 3. Because of tolerances in dimensions of the parts involved in the fastening, in particular the supporting element with regard to its dimensions and its position, the screw carrier 8 does not lie directly on the end face of the fastening dome 3 but instead is pulled into surface contact with the fastening dome 3 only by being tightened "until it locks" by means of the fastening screw 6 is the screw carrier 8 drawn into surface contact through the screw head 6 resting on the screw carrier 8, i.e., it is pressed against the end face of the fastening dome 3 without any gaps so that mechanical stresses build up in the parts involved.

What is not appreciated by the prior art is that the disadvantage of such a fastening device consists of the fact that the mechanical stresses built up due to the lack of compensation for tolerance can lead to excessive loads to failure of the screw carrier 8 due to cracking or breakage when the dimensional tolerances of the parts involved add up unfavorably. Furthermore, such a static long-term load can cause a settling behavior due to the increase in material deformation over a period of time when using plastic for the parts involved so that the pre-stress is reduced; but, in the worst case, it disappears completely.

Accordingly, there is a need for an improved mounting device with which the tolerances of the parts involved will be compensated for.

ASPECTS AND SUMMARY OF THE INVENTION

An aspect of the present invention is to provide a mounting device of the type defined in the introduction with which the tolerances of the parts involved are to be compensated. In particular, the module should be held on the outside housing with the most constant possible force over the intended temperature use range. Furthermore, another aspect of the present invention, is to provide a fastening screw for the mounting device.

The inventive approach is characterized in that the screw shaft of the fastening screw has a front shaft section with a thread, this front shaft section being accommodated in the fastening position by the inside thread of the thread carrier. Additionally, the screw shaft of the fastening screw has another shaft section which is adjacent on the front shaft section on the head of the screw to receive a spring element, this spring element being pre-stressed when the fastening screw is screwed into the inside thread against the screw carrier and a stop on the screw head so that the module is pressed against the supporting element and a gap remains between the thread carrier and the screw carrier in the fastening position of the front shaft section which has screwed completely into the thread carrier. The fastening screw may be designed as a self-cutting or thread-cutting screw so that the aforementioned inside thread is the automatic result when first tightening the fastening screw.

With this inventive screw connection, a "floating mount" is achieved in a certain area because of the spring element, so this achieves an equalization of tolerance over the gap because this is not attached to the thread carrier by tightening the fastening screw until it locks in place through pressing the screw carrier against the thread carrier as in the state of the art.

With this spring element, practically all the tolerances that occur are compensated for, while at the same time, because of the spring force generated by the pre-stressed spring element, the module is pressed against the supporting element via the screw carrier with a defined and determined strength. Since the thread is provided only on the front shaft section, the fastening screw can always be tightened with the same defined torque. Because of the spring element, the parts involved, in particular the screw carrier, are not overloaded; instead, this screw carrier receives the pressing force made possible by the spring element. Thus, a constant pressing force is ensured even over a larger temperature range. A securing effect against loosening of the fastening screw is also achieved with the spring element.

According to a further embodiment of the present invention, it is possible to design the screw head as a stop for the spring element on the screw head end, so that this fastening screw has a simple design.

According to a further embodiment of the present invention, as a stop on the screw head end for the spring element between the front shaft section and the screw head, a peripheral collar is provided on the additional shaft section as a stop on the screw head end. It is thus possible to select the shaft area between the peripheral collar and the screw head to be somewhat longer accordingly for the purpose of better accessibility to the mounting site.

To ensure a reproducible screw-in depth of the front shaft section having the thread into the inside thread of the thread carrier, it is advantageous according to a further refinement of the invention to select the diameter of the additional shaft section to be larger than the outside diameter of the front shaft section so that the shoulder thereby formed at the transition from the front shaft section to the additional shaft section, running around the shaft of the fastening screw, rests on the thread carrier. The thread carrier is preferably designed with a blind thread as an inside thread.

According to a further embodiment of the present invention, it is especially advantageous to design the screw carrier as a fastening flange having a through-opening to receive the shaft of the fastening screw.

For better guidance of the spring element, which is preferably designed as a compression spring or as a plate spring, an according to a further embodiment of the present invention, a bushing is shaped on the fastening flange on the through-opening of the fastening flange on the screw head end, the spring element being guided in this bushing. The diameter of the peripheral collar on the shaft of the fastening screw on which the spring element is supported is preferably adapted to the inside diameter of this bushing to facilitate insertion of the fastening screw assembled with the spring element and thereby permit simple assembly.

According to a further embodiment of the present invention, it is especially advantageous to adjust the gap provided by adjusting the length of the shaft between the end of the front screw section on the screw head end and the stop for the spring element so that the mechanical tolerances acting in the axial direction of the fastening screw are compensated.

The second inventive approach mentioned above relates to a fastening screw having a screw head and a screw shaft having a thread for fastening a module on a component, such that a force-locking connection between a thread carrier having an inside thread corresponding to the fastening screw and connected to the component and a screw carrier connected to the module is established by means of the fastening screw.

According to the present invention the fastening screw is designed so that the shaft of the fastening screw has a front shaft section with a thread, such that this front shaft section is accommodated by the inside thread in the fastening position. Further, the shaft of the fastening screw has another shaft section connected to the front shaft section on the screw head end to receive a spring element, such that this spring element is pre-stressed against the screw carrier and a stop on the screw head end when tightening the fastening screw into the inside thread so that the module is thereby forced against the supporting element and a gap remains between the thread carrier and the screw carrier in the fastening position of the front shaft section which is screwed completely into the thread carrier.

According to a refinement of the invention, a peripheral collar is provided on the additional shaft section as a stop for the spring element on the screw head end between the front shaft section and the screw head.

The above, and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
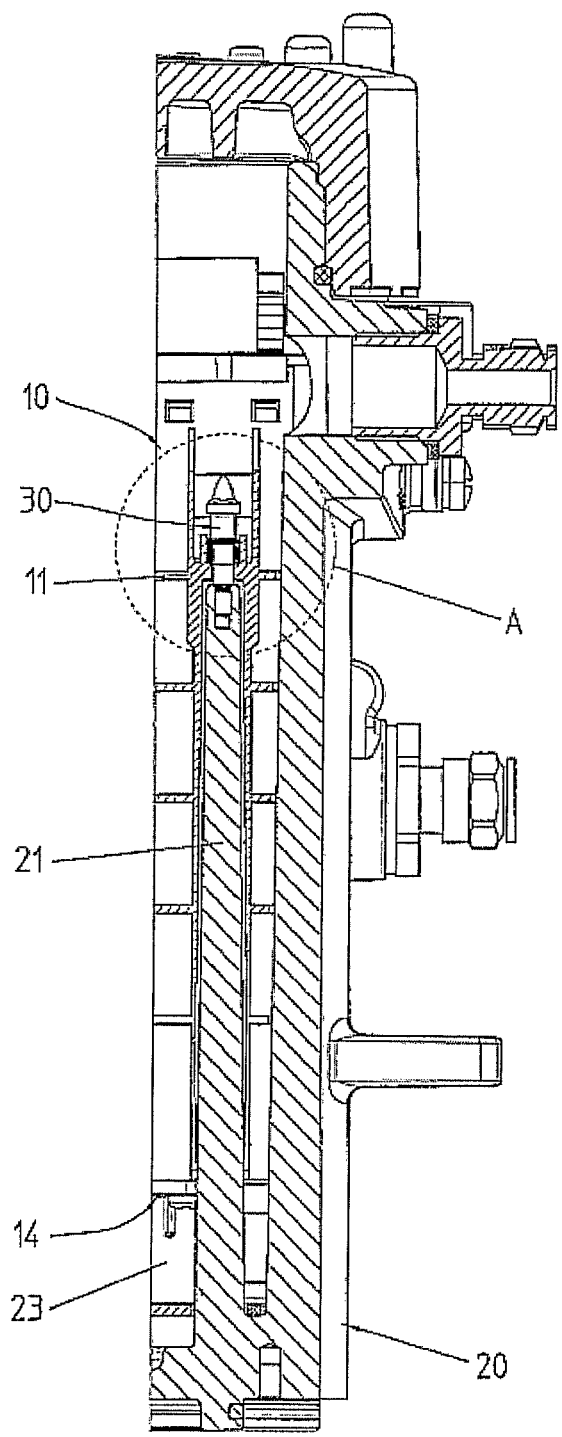
FIG. 1 shows a schematic sectional diagram of a detailed view of a module connected to an outside housing of a filling level meter as an exemplary embodiment of an inventive mounting device.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

According to FIG. 1, an electronic unit is connected as a module 10 to an outside housing 20 of a filling level meter as another module in a force-locked connection by means of at least one fastening screw 30. To do so, the module 10 is brought up to the outside housing 20 for mounting in such a way that the module 10 is supported with a supporting edge 14 on a supporting element 23 connected to the outside housing 20 so that a fastening dome 21 which is connected to the outside housing 20 is situated in the area of a screw carrier and/or a fastening flange 11, as shown in the detailed view of the section A shown in FIG. 2.

Figure 2:
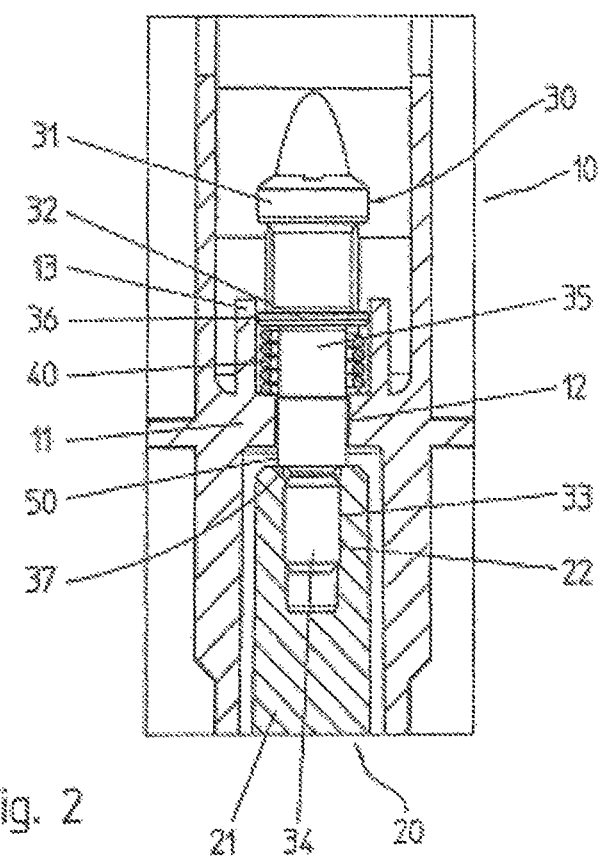
FIG. 2 shows an enlarged detail of the schematic sectional diagram according to FIG. 1.
Figure 3:
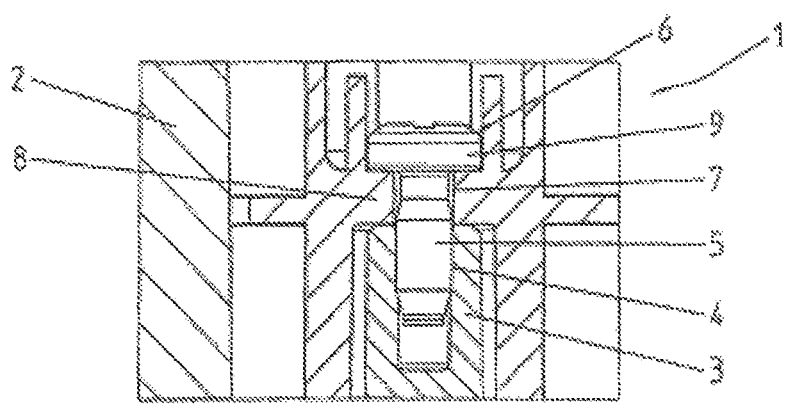
FIG. 3 shows a schematic sectional diagram of a mounting device according to the prior art.

As FIG. 2 shows, a gap 50 remains between the end face of the fastening dome 21 and the screw carrier 11 due to the support of the module 10 on the supporting element 23, where this gap is caused by tolerances in dimensions of the parts involved, in particular the dimensional tolerances of the supporting element 23 with regard to its dimensions. Depending on the combination of dimensional tolerances occurring, the gap 50 may be larger or smaller.

The fastening dome 21 has an inside thread 22 on the end face as a blind thread which corresponds to a thread 33 of the fastening screw 30. The screw carrier and/or a fastening flange 11 connected to the module 10 is provided with a through-opening 12 to receive the fastening screw 30.

The fastening screw 30 has a screw head 31 and is guided through the through-opening 12 together with a screw spring 40 as the spring element is screwed into the fastening dome 21 by means of the thread 33 arranged on a front shaft section 34 of the screw shaft 32. A plate spring may also be used as the spring element 40.

Another shaft section 35 with a larger diameter in comparison with the diameter of the front shaft section 34 is connected to the front shaft section 34 with the thread 33 on the screw head end, so that a peripheral shoulder 37 resting on the end face of the fastening dome 21 and the fastening screw 30 with its thread 33 is formed at the transition between these two shaft sections 34 and 35 and is screwed completely into the inside thread 22 of the fastening dome 21 as shown in FIG. 1.

The additional shaft section 35 is bordered at the screw head end by a peripheral collar 36 so that the screw spring 40 is supported against this collar 36 on the one hand and against the fastening flange 11 on the other hand when the fastening screw 30 is screwed into the fastening dome 21. For purpose of better guidance, a sleeve 13 which is provided on the through-opening 12 has an inside diameter such that the screw spring 40 which is pulled onto the additional shaft section 35 can be inserted into this sleeve 13.

A last shaft section, whose diameter is larger in comparison with that of the additional shaft section 35, is situated between the additional shaft section 35 and the screw head 31. Instead of this last shaft section as well as the peripheral collar 36, the screw head 31 may be used as a stop for the screw spring 40.

On screwing the fastening screw 30, the screw spring 40 generates an increasing pre-stress which presses the fastening flange 11 in the direction of the fastening dome 21 and thus presses the module 10 in the direction against the supporting element 23 (FIG. 1) without the fastening flange 11 coming to lie directly on the end face of the fastening dome 21 in the completely screwed-in state of the fastening flange 11 and instead the gap 50 is retained.

The module 10 may thus slide along the screw shaft in a defined area so that due to this so-called "floating mount," a compensation of the tolerance of the parts involved is possible on the one hand and on the other hand a secure fastening of the module 10 onto the outside housing 20 of the additional module, for example, the filling level meter here, is ensured over a large temperature range because of the spring pretention of the screw spring 10, and because of the spring force acting on the fastening flange 11, the module 10 is pressed against the supporting element 23.

The fastening screw 30 can always be tightened with the same defined torque because the depth to which the thread 33 is screwed into the fastening dome 21 is limited by the shoulder 37. The screw spring 40 prevents the fastening flange 11 from being overloaded because it is acted upon only by the pressing force generated by the screw spring 40.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A mounting device for fastening a module onto a component, said mounting device comprising
   (a) a fastening screw, said fastening screw further comprising; (i) a screw head; and (ii) a screw shaft comprising a thread;
   (b) a screw carrier connected to said module to receive said screw shaft, said screw carrier designed as a fastening flange having a through-opening to receive said screw shaft, and a bushing shaped onto said fastening flange in which a spring element is guided on said screw head end on said through-opening; and
   (c) a thread carrier,
   wherein said thread carrier is connected to said component and further comprises an inside thread corresponding to said thread of said fastening screw,
   wherein a force-locking connection between said screw carrier and said thread carrier is established by means of said fastening screw in a fastening position, and said module is supported on a supporting element of said component in said fastening position;
   wherein said shaft has a front shaft section having said thread, such that said front shaft section is accommodated by said inside thread in said fastening position, and wherein said shaft has an additional shaft section to receive said spring element, said additional shaft section being connected to said front shaft section on said screw head end, such that said spring element is pre-stressed against said screw carrier and a stop on said screw head end when said fastening screw is screwed into said inside thread so that said module is pressed against said supporting element and in said fastening position of said front shaft section which is completely screwed into said thread carrier, a gap remains between said thread carrier and said screw carrier;
   wherein a peripheral collar is provided on said additional shaft section as a second stop on said screw head end between said front shaft section and said screw head; and
   wherein a sleeve is provided on said through-opening, said sleeve having an inside diameter such that said spring element on said additional shaft section is capable of being inserted into said sleeve.

2. The mounting device according to claim 1, wherein said screw head is designed as a first stop for said spring element on said screw head end.

3. The mounting device according to claim 1, wherein a diameter of said additional shaft section is larger than an outside diameter of said front shaft section in order to form a peripheral shoulder running around said shaft, such that said shoulder rests on said thread carrier in said fastening position.

4. The mounting device according to claim 1, wherein said thread carrier is designed as a fastening dome with a blind thread as said inside thread.

5. The mounting device according to claim 1, wherein a diameter of said collar corresponds to an inside diameter of said bushing for inserting said peripheral collar of said shaft into said bushing.

6. The mounting device according to claim 1, wherein said spring element is designed as a compression spring.

7. The mounting device according to claim 6, wherein said compression spring is a helical spring.

8. The mounting device according to claim 6, wherein said compression spring is a plate spring.

9. The mounting device according to claim 1, wherein by adjusting a length of the additional screw shaft between an end of the front shaft section on said screw head end and said peripheral collar for said spring element, a gap is determined such that mechanical tolerances acting in the axial direction of said fastening screw are compensated.

10. The mounting, device according to claim 1, wherein said inside thread is formed by said fastening screw.

11. The mounting device according to claim 1, wherein said fastening screw is embodied as a self-cutting screw.

12. The mounting device according to claim 1, wherein said component is an outside housing of a second module.

13. A fastening screw, said fastening screw comprising;
   (a) a screw head; and
   (b) a screw shaft, said screw shaft further comprising;
      (i) a thread fix fastening a module onto a component for a mounting device such that a force-locking connection as established therebetween;

(ii) a thread carrier which is connected to said component and has an inside thread corresponding to said fastening screw; and (iii) a screw carrier connected to said module by means of said fastening screw and said module and is supported on a supporting element of said component in a fastening position, said screw carrier designed as a fastening flange having a through-opening to receive said screw shaft, and a bushing shaped onto said fastening flange in which a spring element is guided on said screw head end on said through-opening, wherein said screw shaft of said fastening screw has a front shaft section with a thread, such that said front shaft section is accommodated by said inside thread in said fastening position, wherein said screw shaft of said fasting screw has an additional shaft section which is connected to said front shaft section at said screw head end for receiving said spring element, such that said spring element is pre-stressed against said screw carrier when said fastening screw is screwed into said inside thread against said screw carrier and a stop on said screw head end so that said module is thereby forced against said spring element and a gap remains between said thread carrier and said screw carrier in said fastening position of said front shaft section which is completely screwed into said thread carrier, wherein a peripheral collar is provided on said additional shaft section as a stop on said screw head end between said front shaft section and said screw head, and wherein a sleeve is provided on said through-opening, said sleeve having an inside diameter such that said spring element on said additional shaft section is capable of being inserted into said sleeve.

14. The fastening screw according to claim 13, wherein said screw head is designed as a first stop for said spring element on said screw head end.

15. The fastening screw according to claim 13, wherein the diameter of said additional shaft section is larger than the outside diameter of said front shaft section in order to form a peripheral shoulder running around said shaft, such that said shoulder rests on said thread carrier in said fastening position.

16. The fastening screw according to claim 13, wherein said thread carrier is designed as a fastening dome with a blind thread as said inside thread.

17. The fastening screw according to claim 13, wherein the diameter of said collar corresponds to the inside diameter of said bushing for inserting said peripheral collar of said shaft into said bushing.

18. The fastening screw according to claim 13, wherein said spring element is designed as a compression spring.

19. The fastening screw according to claim 18, wherein said compression spring is selected from the group consisting of a helical spring and a plate spring.

20. The fastening screw according to claim 13, wherein by adjusting the length of the additional screw shaft between the end of the front shaft section on said screw head end and said peripheral collar for said spring element, a gap is determined such that the mechanical tolerances acting in the axial direction of said fastening screw are compensated.

* * * * *